US 8,256,969 B2

(12) United States Patent
Arai et al.

(10) Patent No.: US 8,256,969 B2
(45) Date of Patent: Sep. 4, 2012

(54) OPTICAL CONNECTOR STOP RING, OPTICAL FIBER CORD WITH OPTICAL CONNECTOR USING THE SAME AND METHOD FOR MANUFACTURING OPTICAL FIBER CORD WITH OPTICAL CONNECTOR (75) Inventors: Norimasa Arai, Chiba (JP); Junji Taira, Chiba (JP); Yasunari Kawasaki, Chiba (JP)

(73) Assignee: Seikoh Giken Co., Ltd., Chiba (JP)

( * ) Notice: Subject to any disclaimer, the term of this patent is extended or adjusted under 35 U.S.C. 154(b) by 409 days.

(21) Appl. No.: 12/482,302

(22) Filed: Jun. 10, 2009

(65) Prior Publication Data
US 2009/0310919 A1    Dec. 17, 2009

(30) Foreign Application Priority Data

Jun. 12, 2008  (JP) .................................. 2008-154749
Apr. 15, 2009  (JP) .................................. 2009-098673

(51) Int. Cl.
G02B 6/36    (2006.01)
(52) U.S. Cl. ........................................... 385/53; 385/86
(58) Field of Classification Search .................... None
See application file for complete search history.

(56) References Cited

U.S. PATENT DOCUMENTS 5,436,995 A * 7/1995 Yoshizawa et al. ............. 385/86
5,953,476 A * 9/1999 Abe ................................. 385/87

* cited by examiner

Primary Examiner — Tina Wong
(74) Attorney, Agent, or Firm — Knobbe Martens Olson & Bear LLP (57) ABSTRACT To provide an optical fiber cord with an optical connector of higher flexibility resistance, and the method for manufacturing the same are disclosed. An optical fiber cord with an optical connector, wherein said fiber cord, wherein said the optical connector comprising a stop ring having a through hole formed therein, though which said optical fiber is disposed; a crimping ring being disposed around said optical fiber to crimp said stop ring and said optical fiber cord; a ferrule being disposed at the tip end part of said optical fiber in said optical fiber cord; a spring being disposed around said optical fiber and between said ferrule and said stop ring; a plug frame being engaged with said stop ring; a grip being engaged with said plug frame; wherein said through hole of said stop ring having a stepwisely narrowing part in which a hole diameter is gradually reduced from said crimping part side to said ferrule side.

6 Claims, 8 Drawing Sheets (A)

OPTICAL CONNECTOR STOP RING, OPTICAL FIBER CORD WITH OPTICAL CONNECTOR USING THE SAME AND METHOD FOR MANUFACTURING OPTICAL FIBER CORD WITH OPTICAL CONNECTOR

CROSS-REFERENCE TO RELATED APPLICATIONS

This application claims priority to and the benefit of Japanese Patent Application No. 2008-154749, filed on Jun. 12, 2008, in the Japan Patent Office, and Japanese Patent Application No. 2009-098673, filed on Apr. 15, 2009, in the Japan Patent Office. The disclosures of the foregoing applications are incorporated herein in their entireties by reference.

BACKGROUND OF THE INVENTION

1. Field of the Invention

The present invention relates to an optical connector stop ring, an optical fiber cord with an optical connector using the same, and methods for manufacturing an optical fiber cord with an optical connector.

2. Description of the Related Art

In recent years, optical communication systems using optical fibers have been actively developed with increasing speed and capacity of information communication. In such optical communication systems, optical communication is generally performed by connecting an optical connector with the tip end of an optical fiber cord that holds optical fiber the inside thereof, and connecting this optical connector with a device such as an optical communication module.

In general, the optical fiber connector may be formed by passing optical fiber through a boot, a crimping ring, a stop ring and a spring, exposing the optical fiber of the fiber cord, fixing a ferrule to the tip end of the exposed optical fiber, adjusting the locations of said members above for the optical fiber cord, engaging a plug frame with the stop ring, crimping the stop ring and the optical fiber cord by the crimping ring, attaching the boot, and finally engaging a grip with the plug frame.

SUMMARY OF THE INVENTION

However, there is a problem of lower flex resistance where the outer jacket of the optical fiber cord is cut to take out the tension member from the inside thereof, the fiber cord is forced to make narrow to pass through the stop ring, and the optical fiber is fixed to the ferrule, as compared with the case in which the outer jacket is not cut to split. Moreover, in the addition to the above problem, there is a possibility of invasion of foreign substances and moisture, or ruin the appearance when the outer jacket is subjected to cut to split. Therefore, it is difficult to employ a boot having a part where the optical fiber cord is exposed, and there is a problem of that it cannot be avoid utilizing the boot of low flexibility.

Accordingly, there is a need for an optical fiber cord exhibiting higher flexibility resistance with an optical connector, and methods for manufacturing the same.

In one embodiment, an optical fiber cord can be inserted into a stop ring, and a length of the optical fiber can be secured enough to fix with the ferrule without cutting the outer jacket, by configuring the stop ring with a through-hole in which the diameter at the crimping part side is larger than the diameter at the ferrule end surface side. As a result, in some embodiments, an optical fiber cord having high flexibility resistance can be formed with an optical connector without sacrificing its bending property.

In another embodiment, the optical fiber cord with an optical connector according to one aspect of the present invention comprises optical fiber having a buffer member formed, a tension member disposed around the optical fiber, and an outer jacket for containing the optical fiber and the tension member, in which optical connector includes a stop ring having a through-hole formed thereto and a crimping part at one end and containing the optical fiber disposed within the through-hole, a crimping ring for crimping the stop ring and the optical fiber cord, a ferrule disposed at the tip end part of the optical fiber of the optical fiber cord, a spring disposed between the ferrule and the stop ring, a plug frame to be engaged with the stop ring, and a grip part to be engaged with the plug frame, wherein the through-hole of the stop ring having a stepwisely narrowing part where a diameter is gradually reduced from the crimping part side to the ferrule side.

In yet another embodiment, a stop ring for an optical connector has a through-hole formed thereto and a stepwisely narrowing part where a diameter is gradually reduced from the crimping part side to the ferrule side.

In yet another embodiment, a method for fixing ferrule to an optical fiber comprises the steps of: passing an optical fiber cord through a crimping ring; exposing optical fiber from the optical fiber cord; inserting the optical fiber cord in which the optical fiber is exposed, into a stop ring, the stop ring having a through hole formed thereto and a stepwisely narrowing part in which a diameter of the through hole is gradually reduced from a crimping part side to a ferrule side, from the crimping part side; passing the optical fiber through a spring; and fixing a ferrule to the tip end of the optical fiber.

In other embodiments, methods for manufacturing the optical fiber cord with the optical fiber connector comprise the steps of: passing an optical fiber cord through a boot and a crimping ring; exposing optical fiber from the optical fiber cord; inserting the optical fiber cord from the crimping part side, in which the optical fiber is exposed into a stop ring, the stop ring having a through hole from the crimping part side and a stepwisely narrowing part in which a diameter of the through hole is gradually reduced from the crimping part side to the ferrule side thereof, from the crimping part side; passing the optical fiber through a spring; fixing a ferrule to the tip end of the optical fiber; sliding the optical fiber cord from the stop ring to engage the plug frame, a ferrule, and a stop ring with one another; and engaging the plug frame with a grip part.

Therefore, in some embodiments, optical fiber cord with an optical connector of high flexibility resistance, and methods for manufacturing the same can be provided.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other aspects of the invention will be readily apparent from the following description and from the appended drawings (not to scale), which are meant to illustrate and not to limit the invention, and in which.

EXPLANATION OF NUMERICAL REFERENCES

1: optical fiber cord;
1d: outer diameter (of the optical fiber cord);
2: optical connector;
11: buffered optical fiber;
12: buffer member;
13: tension member;
14: outer jacket;
15: optical fiber;
21: stop ring;
22: crimping ring;
23: ferrule;
24: spring;
24d: inner diameter (of the spring);
25: plug frame;
26: grip;
27: boot;
211: through hole;
212: crimping part;
212d: hole diameter (at the crimping part side);
213: ferrule side part;
214: stepwisely narrowing part;
221: through hole (of the sealing ring)
231: flange part; and
232: cylindrical part.

DETAILED DESCRIPTION OF THE PREFERRED EMBODIMENT

The embodiments according to the present invention will now be explained in detail with reference to the drawings, but the present invention is not intended to limited to these embodiments and many different embodiments can be implemented.

In certain optical fiber cords, optical fiber cords having an average diameter of about 3 mm or less are generally used, although the use of optical fiber cord having a larger average diameter of about 4 mm or about 5 mm for house wiring has been considered.

However, a conventional stop ring used for the optical connector has a narrow diameter of its through hole which, as it is, is not capable of passing through the optical fiber cord of the large diameter as mentioned above. Therefore, the optical fiber must be exposed for the entire length of the stop ring, and the ferrule must be fixed with the stop ring while its location is unstable, which causes difficulty in fixing the ferrule with the optical fiber.

To overcome these difficulties, the casing of the optical fiber cord is cut open to take out a tension member to be disposed inside thereof to temporarily force to make the diameter of the optical fiber cord narrower and the stop ring is passed through the cord to fix the optical fiber to the ferrule.

In some embodiments, an optical fiber cord with an optical connector is provided. The optical fiber cord may include optical fiber with a buffer member formed thereto; a tension member disposed around said optical fiber; and an outer jacket. The optical connector may include: a stop ring having a through hole formed therein having a crimping part at one end thereof, though which said optical fiber are disposed; a crimping ring being disposed around said optical fiber to crimp said stop ring and said optical fiber cord; a ferrule being disposed at the tip end part of said optical fiber in said optical fiber cord; a spring being disposed around said optical fiber and between said ferrule and said stop ring; a plug frame being engaged with said stop ring; and a grip being engaged with said plug frame; wherein said through hole of said stop ring having a stepwisely narrowing part in which a hole diameter is gradually reduced from said crimping part side to said ferrule side.

Figure 1:
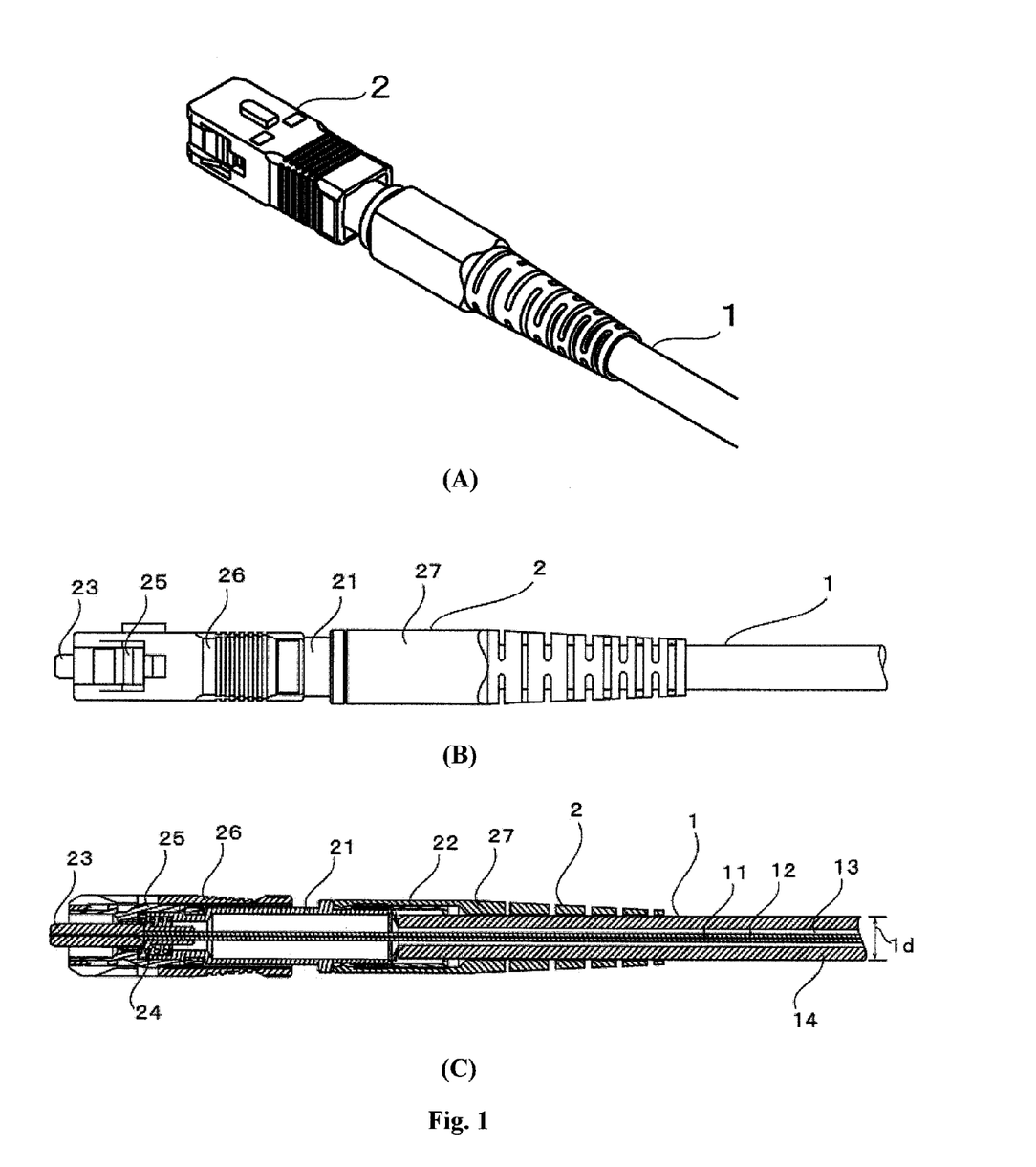
FIG. 1 shows a schematic perspective view (A), a plan view (B), and a cross sectional view (C) illustrating an optical fiber cord with an optical connector of one embodiment according to the present invention.

FIG. 1 shows a schematic perspective view (FIG. 1(A)), a plan view (FIG. 1(B)), and a schematic cross sectional view (FIG. 1(C)) of an optical fiber cord with an optical connector of one embodiment. In some embodiments, to one end of an optical fiber cord 1, an optical connector 2 can be provided, in which the optical fiber cord 1 can comprise buffered optical fiber 11 having optical fiber 15 with a buffer member 12 formed thereto, a tension member 13 disposed around the buffered optical fiber 11, and an outer jacket 14 for containing the buffered optical fiber 11 and the tension member 13. Further, the optical connector 2 comprises a stop ring 21 for disposing the buffered optical member 11 into a through hole 211 formed thereto, a crimping ring 22 for crimping the stop ring 21 and the optical fiber cord 1, a ferrule 23 disposed at the tip end part of an optical fiber 15 in the optical fiber cord 1, a spring 24 disposed between the ferrule 23 and the stop ring 21, a plug frame 25 to be engaged with the stop ring 21, a grip 26 to be engaged with the plug frame 25, and a boot for attaching a part of the stop ring 21, the crimping ring 22, and a part of the optical fiber cord 1, in which the through hole 211 having a stepwisely narrowing part 214 where a diameter is gradually reduced from the crimping part side 212 to the ferrule side 213.

In one embodiment, an optical fiber 15 may include a core and a clad being disposed around the core and having a lower index of refraction than that of the core, thereby efficiently transmitting light. For materials of the core and the clad of the optical fiber, though any known materials as far as they have light transmission ability and appropriate index of refraction can be employed without any limitation, for example, glasses, plastics and the like are suitable. Moreover, a circular shape is preferred for the cross sections of the optical fiber 15.

In some embodiments, the buffer member 12 may be disposed around the optical fiber 15, and used to protect the optical fiber 15. For materials of the buffer member 12, for example, silicone resins, nylon resins, elastomers, UV curable resins, and the like can suitably be employed, but not limited thereto.

In some embodiments, the tension member 13 can relieve the tensile strength in the case where the tensile strength is generated, for example, by bending the buffered optical fiber 11 coated with the buffer member 12 to prevent the optical fiber 15 being damaged. Although, materials of the tension member 13 are not limited as far as the materials have the above functions, for example, aramid fibers and the like are suitable.

In one embodiment, the outer jacket 14 may contain and protect the buffered optical fiber 11 coated by the buffer member 12 and the tension member 13. Although, vinyl chloride resins, elastomers and the like are suitable for materials for the outer jacket 14, but not limited thereto. Further, though the diameter of the outer jacket is not limited, it is preferable that the outer jacket has an outer diameter $1d$ which is larger than the inner diameter of $24d$ of the spring to be disposed, being described below, for example, preferably, about 3.5 mm or larger, more preferably, about 4 mm to about 5 mm, since the optical connector of the embodiment has a large diameter, thereby exhibiting extremely high effects when the conventional optical fiber cord as it is cannot be passed through the stop ring 21.

Figure 2:
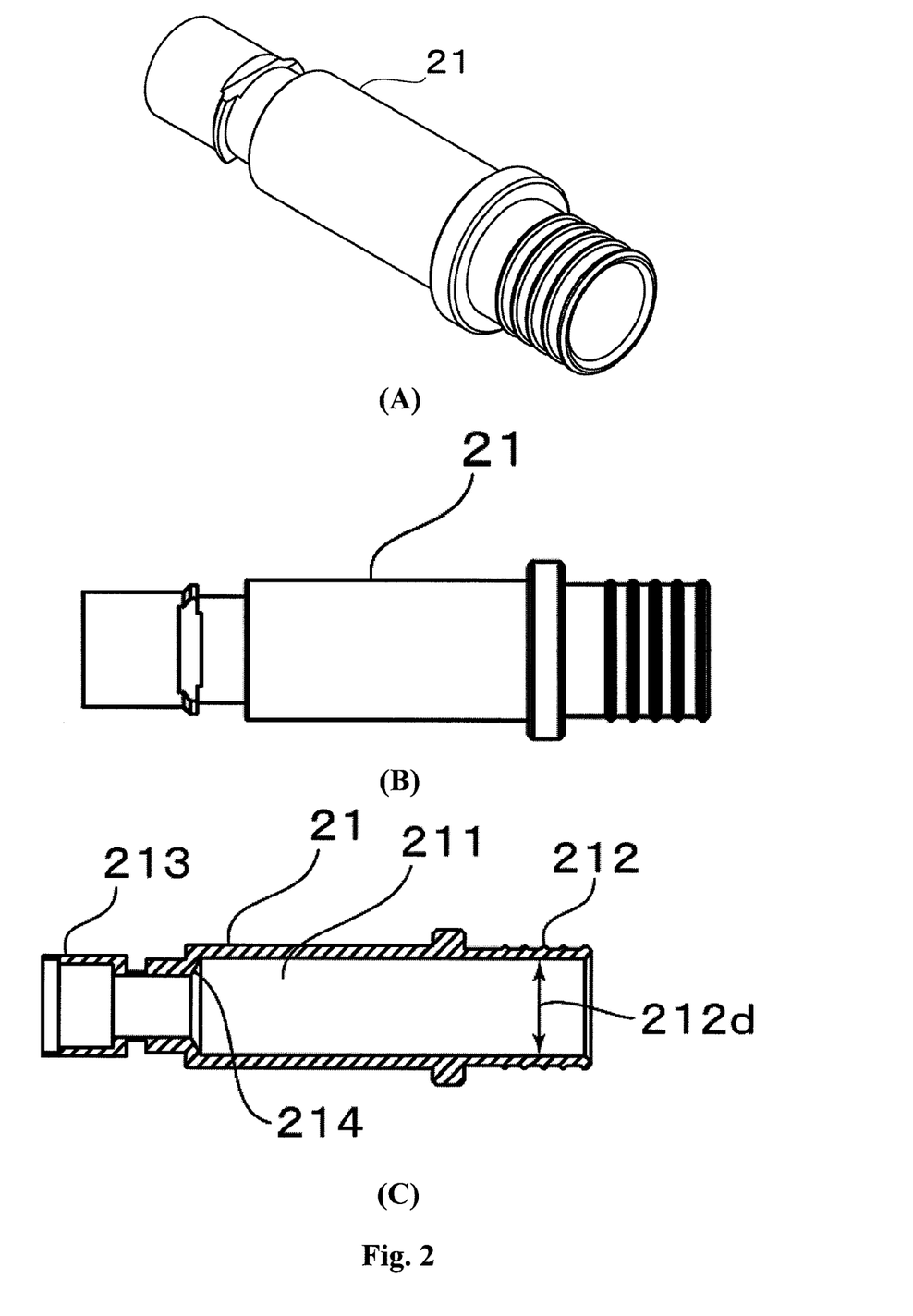
FIG. 2 shows a perspective view (A), a plan view (B), and a cross sectional view (C) illustrating a stop ring for an optical connector of one embodiment according to the present invention.

Now, FIG. 2 shows a perspective view (FIG. 2(A)), a plan view (FIG. 2(B)), and a cross sectional view (FIG. 2(C)) of the stop ring 21 of an embodiment. As shown in the figure, a through hole 211 is formed to the stop ring 21 in the optical connector 2 of the embodiment, and this through hole 211 has a stepwisely narrowing part 214 where a diameter is gradually reduced from the crimping part side 212 to the ferrule side 213. Moreover, it is necessary that the hole-diameter $212d$ of the crimping part side 212 is larger than the outer diameter $1d$ of the optical fiber cord 1 to be inserted (see, FIG. 1). In this way, though it would be clearly understood from the following steps, the optical fiber cord 1 is inserted into the stop ring 21, from the crimping part side 212 to the stepwisely narrowing part 214, and the required safety length to the shaping edge operation such as the connection of the ferrule can be secured. Simultaneously, with the stepwisely narrowing part 214, it can be realized that the hole diameter is reduced and, thus, at the tip end thereof, the ferrule side part 213 can be fitted with the conventional spring 24, the plug frame 25 and the like. Therefore, the conventional springs, plug frames and the like can be employed in various embodiments, almost without any change in their designs. It is preferable that the hole diameter $212d$ of the crimping part side 212 in the present embodiment is provided so as to have a size larger than the outer diameter $1d$ of the optical fiber cord 1 by the thickness of the exposed tension member, since the optical fiber or the tension member are exposed to fitted with the optical fiber cord 1. Preferably, the hold diameter is about 0.1 mm to about 1 mm larger than the outer diameter of the optical fiber cord 1, more preferably, about 0.1 mm to about 0.5 mm larger. Further, the hole diameter $212d$ of at the crimping part side 212 may be partially formed, for example, into a projection shape to the inner surface of the through hole 211. In this manner, the exposing tension member 13 gives static friction force to the stop ring 21 through the hole diameter $212d$ at the crimping part side 212 to prevent the stop ring 21 from unnecessarily moving even though the direction of the optical fiber cord 1 during the operation of shaping the edge, thereby obtaining the effect to improve the assembling workability.

The total length of the stop ring 21 of an embodiment can range from about 15 mm to about 35 mm, and preferably, in the range from about 20 mm to about 30 mm. Within the range, assembling the connector is possible and unnecessary length of the connector can be controlled.

In the stop ring 21 according to an embodiment, the distance 212L between the end surface of the crimping part side 212 and the stepwisely narrowing part 214 is preferably in the range from about 10 mm to about 30 mm, more preferably, in the range from about 15 mm to about 25 mm. Within the range, the advantage that necessary optical fiber length to fix the ferrule can be secured can be provided. In this case, the distance of the stepwisely narrowing part 214 is defined based on position where the narrowing begins as a datum point, which is similarly applied to the distance 213L between the end surface of the ferrule side part 213 and the stepwisely narrowing part 214, being described below (see, FIG. 3).

Figure 3:
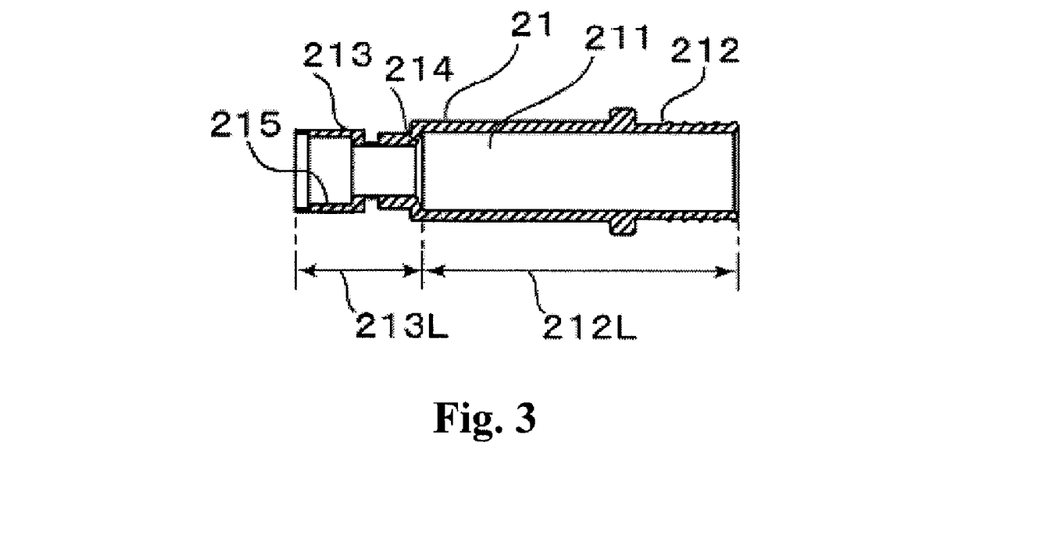
FIG. 3 shows a cross sectional view illustrating near the stepwisely narrowing part in the stop ring of one embodiment according to the present invention.

In another embodiment, the end surface of the distance 213L between the ferrule side part 213 and the stepwisely narrowing part 214 is preferably within the range from about 3.7 mm to about 15 mm, more preferably, within the range from about 5 mm to about 10 mm in the stop ring 21 of the present embodiment. With such a configuration above, it is advantageous to secure the thickness of the seating surface for holding the spring within the stop ring.

In yet another embodiment, when the distance 213L between the ferrule side part 213 and the stepwisely narrowing part 214 is 1, the distance between the end surface of the crimping part side 212 and the stepwisely narrowing part 214 is preferably within the range from about 0.5 to about 4.0, more preferably, within the range from about 2.0 to about 3.5 in the stop ring 21 of the present embodiment. With such a configuration, it is advantageous to avoid the connector being suffered from excessive moment when the optical fiber cord is bent.

Figure 4:
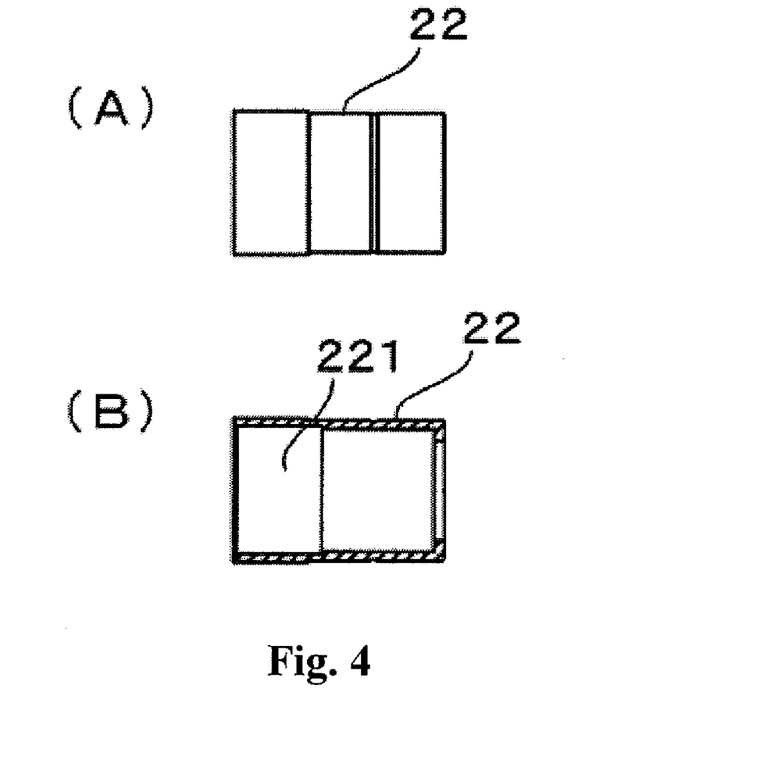
FIG. 4 shows a plan view (A) and a cross sectional view (B) illustrating a crimping ring of one embodiment according to the present invention.

FIG. 4 shows a plan view (FIG. 4(A)), and a cross sectional view (FIG. 4(B)) of an embodiment of the crimping ring 22. The crimping ring 22 is for crimping each of the stop ring 21 and the optical fiber cord 1. The crimping ring 22 is configured to have a hollow by forming the through hole 221 therein, in which the inner diameter of the through hole is preferred, but not limited, to be larger than the outer diameter of the stop ring 21, because it is necessary to cover and crimp the crimping part of the stop ring 21. Provided that, it is useful to configure the crimping ring 22 so as to have the through hole having the diameter at the side of the stop ring which is different from the diameter at the opposite side, since the crimping ring 22 is also required to crimp the optical fiber cord 1 at the other side. It is preferred that the length of the crimping ring 22 is in the range from about 5 mm to about 20 mm, more preferably, in the range from about 5 mm to about 15 mm.

Figure 5:
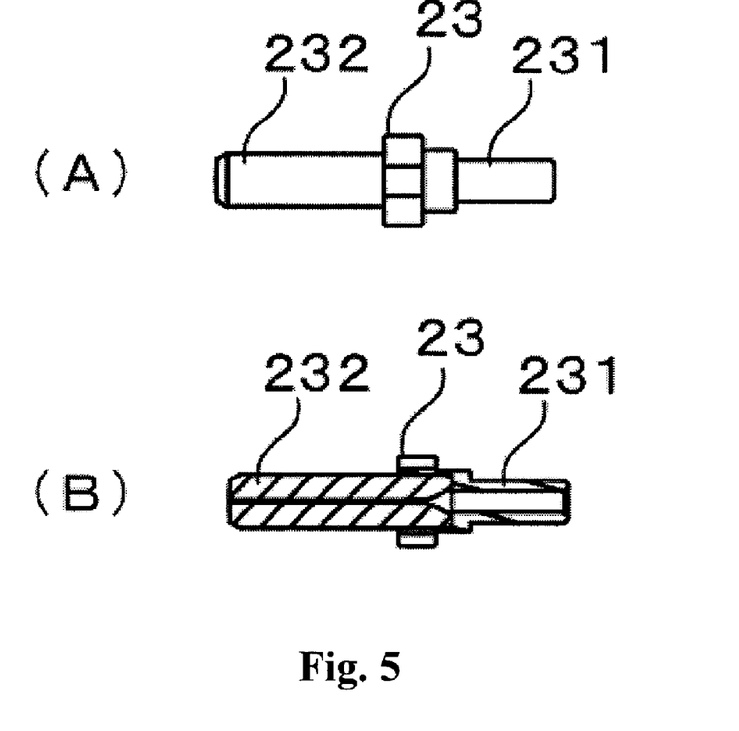
FIG. 5 shows a plan view (A) and a cross sectional view (B) illustrating a ferrule of one embodiment according to the present invention.

FIG. 5 shows a plan view (FIG. 5(A)), and a cross sectional view (FIG. 5(B)) of the ferrule 23 of an embodiment. As shown in this figure, the ferrule 23 is disposed to the tip end part of the optical fiber 15 in the optical fiber cord 1, and configured to have a flange part 231 and a cylindrical part 232. To every one of the flange part 231 and the cylindrical part 232, a through hole is formed, through which the tip end of the optical fiber 15 can be passed, and the ferrule can be fixed to that by adhering with an adhesive and the like.

Figure 6:
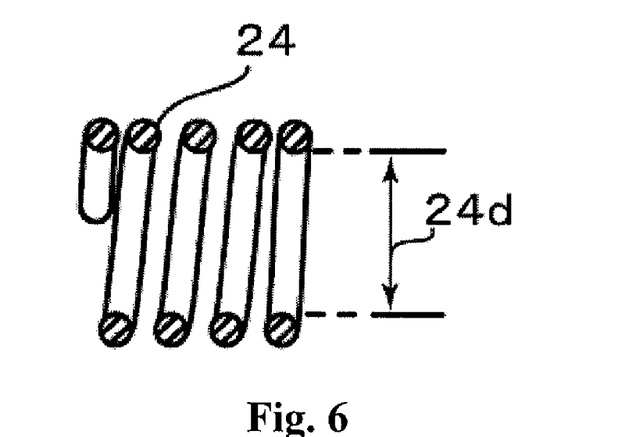
FIG. 6 shows a cross sectional view illustrating a spring of one embodiment according to the present invention.

FIG. 6 shows a cross sectional view illustrating the spring 24 of an embodiment. As shown in this figure, the spring 24 is configured to be hollow and spiral, and is disposed around the buffered optical fiber 11 and between the ferrule 23 and the stop ring 21, being useful for providing flexibility at the position of the ferrule 23 and applying a pressure thereto. The inner diameter 24d of the spring 24 can be narrower than the diameter of the optical fiber cord 1 of the illustrated embodiment. Specifically, the inner diameter is about 3 mm because of the conventional optical cable generally having about 3 mm.

The plug frame 25 can be engaged with the stop ring 21, in which the flange part 231 of the ferrule 23 and the spring 24 are disposed between the stop ring 21 and the plug frame 25.

The grip 26 can be engaged with the plug frame 25. The user can connect the optical connector 2 to an apparatus such as an optical module by grasping the grip 26.

Figure 7:
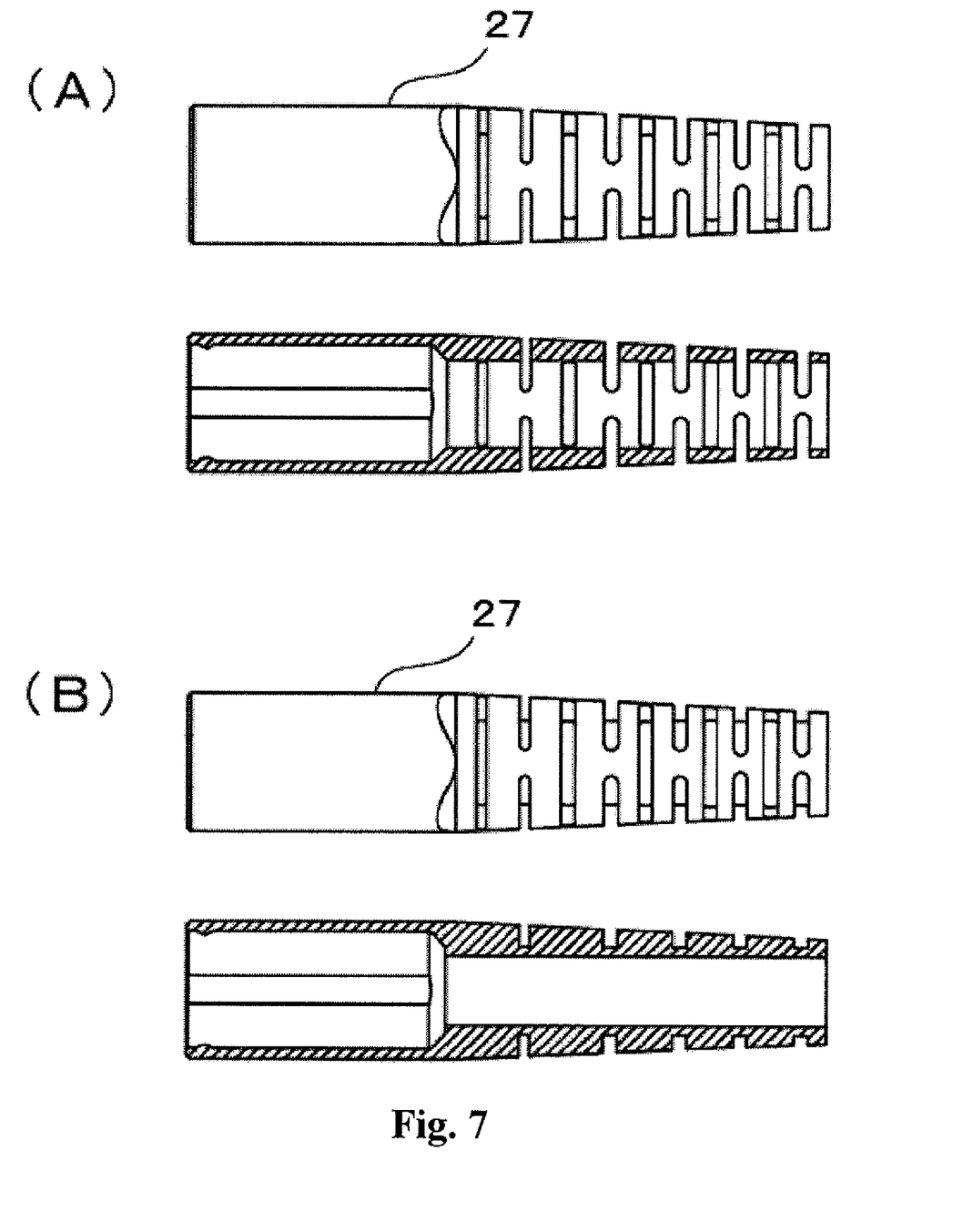
FIG. 7(A) shows a schematic plan view and a schematic cross sectional view illustrating a boot in which parts for exposing an optical fiber cord are formed.
FIG. 7(B) shows a schematic plan view and a schematic cross sectional view illustrating a boot in which no part for exposing the optical fiber cord is formed.

In an embodiment, the boot 27 covers a part of the stop ring 21, the crimping ring 22 and a part of the optical fiber cord 1, which can reduce the force applied to the optical fiber cord 1, even when the optical fiber cord is bent. By the optical fiber connector of the present embodiment, the cutting of the outer jacket 14 of the optical fiber cord 1 is reduced or eliminated, improving the appearance thereof, and increasing the bending property thereof, as compared with the boots in the prior art. Therefore, the boot in which parts for exposing the optical fiber cord are partially formed can be easily employed. FIG. 7(A) shows a schematic plan view and a cross sectional view illustrating the boot in which parts for exposing the optical fiber cord are partially formed, and FIG. 7(B) shows a schematic plan view and a cross sectional view illustrating the boot in which no part for exposing the optical fiber cord are partially formed.

Accordingly, in some embodiments, the optical fiber cord with the optical connector is not required to cut up at the outer jacket, and will become an optical fiber cord excellent in the flexibility resistance. Since it is not necessary to cut up the outer jacket, any invasions of foreign substances or drops of water from the cut parts can be avoided. Furthermore, since it is not necessary to hide cut parts, an excellent effect that the boot is not elongated more than necessary can be provided.

Figure 8:
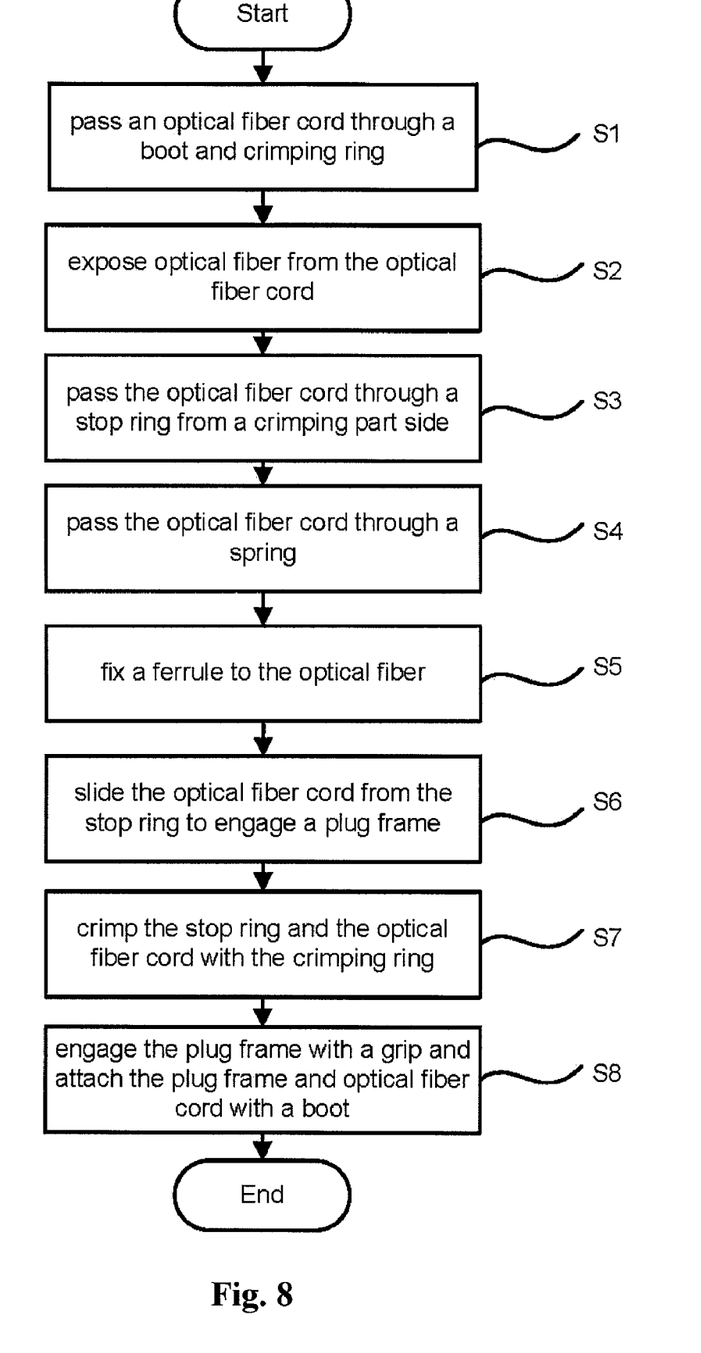
FIG. 8 shows a method for manufacturing an optical fiber cord with an optical fiber connector of one embodiment according to the present invention.

Next, the method for manufacturing the optical fiber cord with the optical connector according to an embodiment will be explained below. FIG. 8 shows a flow chart relating to the method for manufacturing the optical fiber cord with the optical connector of the embodiment. As shown in this figure, the method for manufacturing the optical fiber cord with the optical connector of the illustrated embodiment comprises the steps of: passing the optical fiber cord 1 through the boot and the crimping ring (S1); exposing the tension member 13 and the optical fiber 15 from the optical fiber cord 1 (S2); inserting the optical fiber cord 1 from which the optical fiber 15 is exposed from the crimping side into the stop ring 21 having a through hole formed thereto having a stepwisely narrowing part where a diameter is gradually reduced from the crimping part side to the ferrule side (S3); passing the buffered optical fiber 11 through the spring 24 (S4); fixing the optical fiber 15 to the tip end of the ferrule 23 (S5); sliding the optical fiber cord 1 from the stop ring 21 to engage plug frame 25, the ferrule 23 and the stop ring 21 with one another (S6); crimping the stop ring 21 and the optical fiber cord 1 by the crimping ring 22 (S7); and engaging the plug frame 25 with the grip 26 and attaching them with the boot 27(S8).

Figure 9:
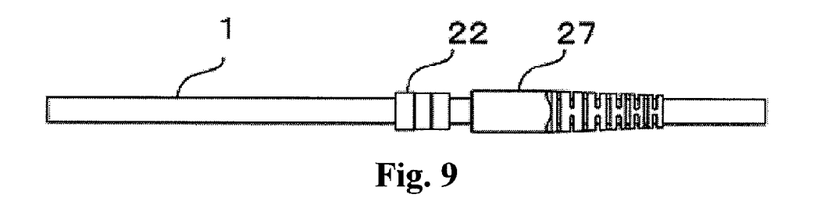
FIG. 9 illustrates a step of passing an optical fiber cord through a boot and a crimping ring.

In one embodiment, firstly, the optical fiber cord 1 is passed through the boot 27 and the crimping ring 22 (see, S1, FIG. 9). By previously fitting the boot 27 and the crimping ring 22, subsequent crimping operation and attaching the boot 27 operation can be facilitate.

Figure 10:
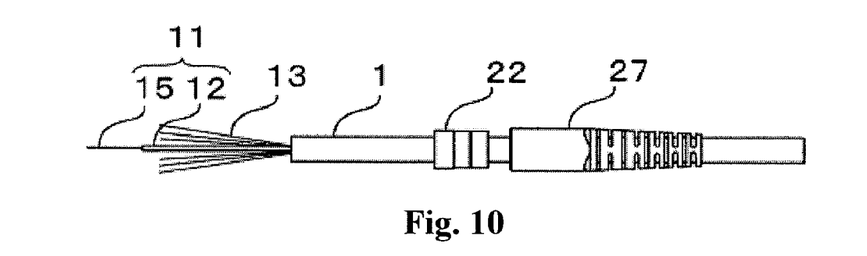
FIG. 10 illustrates a step of exposing an optical fiber from an optical fiber cord.

In some embodiments, the step of exposing the optical fiber 15 from the optical fiber cord 1 (S2) (see, FIG. 10) is followed by fixing to the ferrule 23. It is preferred that the exposure of the optical fiber 15 is made in a stepwise manner: an exposed part in which only the outer jacket 14 is removed; an exposed part in which only the outer jacket 14 and the tension member 13 are eliminated; an exposed part in which the outer jacket 14, the tension member 13 and the buffer member 12 are removed to expose the optical fiber 15. In this case, the length of the exposed part where only the optical fiber 15 is exposed is preferably in the range from about 9 mm to about 15 mm, the length of the removed part of the outer jacket 14 (the distance between the end surface of the outer jacket 14 to the tip end of the optical fiber 15) is preferably in the range from about 25 mm to about 60 mm. The length of the exposed tension member 13 is preferably in the range from about 5 mm to about 20 mm. Here, in order to prevent the optical fiber 15 from being damaged, the operation to eliminate the buffer member 12 can be introduced between the step of inserting (S4) the buffered optical fiber 11 into the spring 24 and the step (S5) of fixing the ferrule 23 to the tip end of the optical fiber 15.

In some embodiments, the step of exposing the optical fiber 15 from the optical fiber cord 1 is carried out after the step of passing the optical fiber cord 1 through the boot 27 and the crimping ring 22 in order to provide the explanations for some embodiments and to reduce the possibility that the optical fiber 15 are damaged as much as possible, the step of exposing the optical fiber 15 from the optical fiber cord 1 is carried out prior to the step of passing the optical fiber cord 1 through the boot 27 and the crimping ring 22, as long as the exposed optical fiber 15 can be inserted into the boot 27 and the crimping ring 22 without any damages thereof.

Figure 11:
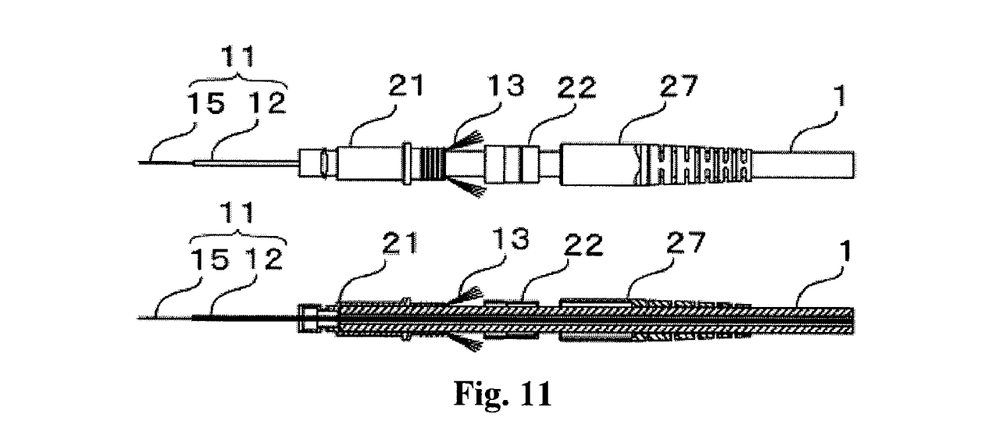
FIG. 11 illustrates a step of inserting an optical fiber cord from a crimping part side into a stop ring.

In the step of inserting the optical fiber cord 1 in which the optical fiber 15 is exposed from the crimping part side into the stop ring 21 having the through-hole and the stepwisely narrowing part where a diameter is gradually reduced from the crimping part side to the ferrule side formed thereto (see S3, FIG. 11, the upper one showing a plan view and the lower showing a cross sectional view), the outer jacket 14 of the optical fiber cord 1 is inserted to contact with the above stepwisely narrowing part 214. In this way, sufficient exposed portion of the optical fiber can be secured without cutting up the outer jacket 14, as in the prior art, and, thus, the optical fiber cord having an excellent durability and flexibility resistance can be provided.

Figure 12:
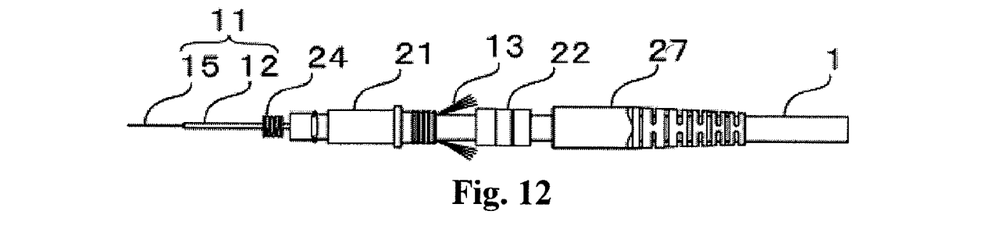
FIG. 12 illustrates a step of passing an optical fiber through a spring.

In some embodiments, the step of passing the buffered optical fiber 11 through the spring 24 (see S4, FIG. 12) is carried out prior to the step of fixing the optical fiber 15 to the tip end of the ferrule 23 (S5). In some embodiments, the next step can be carried out while spring 24 can be contained within a groove 215 for the spring, which is formed at the end surface side of the ferrule side 213 of the stop ring 21. It is more useful the spring 24 and the stop ring 21 are temporarily fixed with each other by a tape and the like, if possible. Because, in some embodiments, the stop ring 21 can limit unnecessary movement by the static friction acting between it and the tension member 13 exposed from the optical fiber cord 1, as described above, the spring 24 can also be capable of preventing the unnecessary movement during the shaping edge operation by temporarily fixing the spring 24 and the stop ring 21. For the temporarily fixing means, it is useful to use a temporal fixture which can be detachable after the shaping edge operation.

Figure 13:
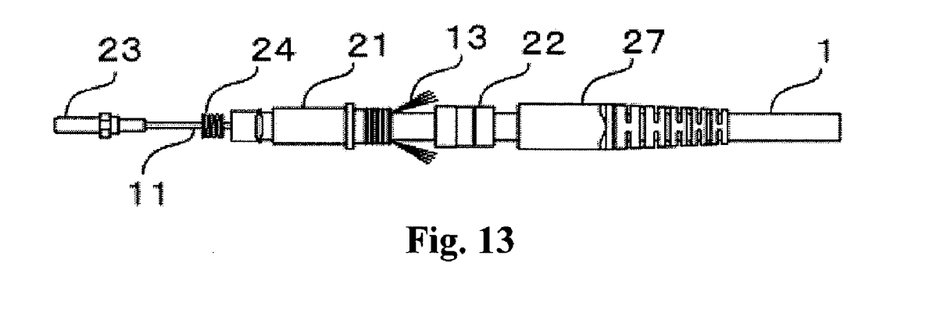
FIG. 13 illustrates a step of fixing a ferrule to a tip end of an optical fiber.

The step of fixing the ferrule 23 to the tip end of the optical fiber 15 (S5, see FIG. 13) can be carried out by injecting an adhesive to the through hole of the flange part 231 and the cylindrical part 232, followed by inserting the optical fiber 15 to cure.

Figure 14:
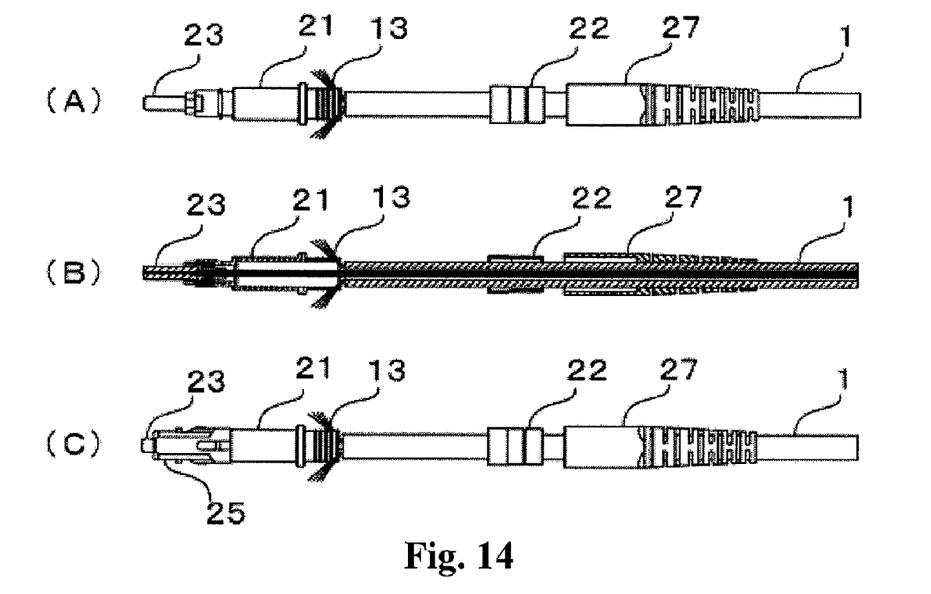
FIG. 14 illustrates a plan view (A) and a cross sectional view (B) of the step of sliding an optical fiber cord from a stop ring to engage a plug frame and the like with one another, and a plan view (C) after the plug frame is engaged with the stop ring.

The step of sliding the optical fiber cord 1 from the stop ring 21 to engage plug frame 25, the ferrule 23 and the stop ring 21 with one another (S6, see FIG. 14: (A) showing a plan view, (B) showing a cross sectional view, and (C) showing a plan view after the plug frame 25 is engaged with the stop ring 21, respectively) can be realized by previously providing a concave part and the corresponding convex part to the plug frame 25 and the stop ring 21, respectively, to engage them each other, but not limited thereto. In this step, the end surface of the outer jacket 14 at the side where the buffered optical fiber 11 of the optical fiber cord 1 may be within the through hole 211 of the stop ring 21, even though said end surface is outside of the end surface of the crimping part 212 of the through hole 211 of the stop ring 21, as long as the end surface of the outer jacket 14 is in within the through hole of the crimping ring 22 at crimping the crimping ring 22. In particular, when the end surface of the outer jacket 14 is located near the end surface of the crimping part side 212 of the stop ring 21 (preferably, within about 10 mm, more preferably, within about 5 mm), there is an advantage of more strongly crimping at crimping the stop ring 21 and the crimping ring 22, since the tension member 13 can be easily disposed there between.

Figure 15:
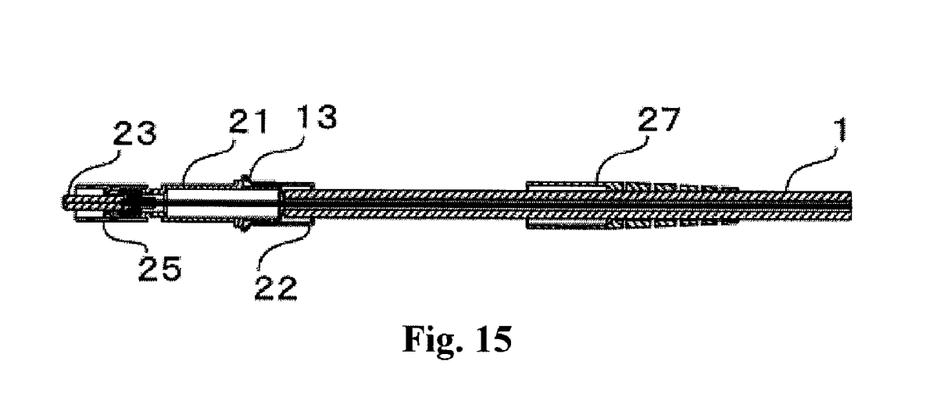
FIG. 15 is a explanatory diagram illustrating a method for crimping a stop ring with a crimping ring.

A method according to one embodiment may further include the step of crimping the stop ring 21 and the optical fiber code 1 with the crimping ring 22 (S7). For the crimping method, but it is not limited to, for example, the stop ring 21 can be preferably crimped by sandwiching the tension member 13 between the stop ring 21 and the crimping ring 22 while applying a pressure from the around them by using a crimping tool and the like, as shown in FIG. 15. Moreover, for the method for crimping the optical fiber cord 1, after positions of the outer jacket 14 and the crimping ring 22 are adjusted, the optical fiber cord 1 can be crimped by applying a pressure by using a crimping tool and the like. It is preferred that the length where the stop ring 21 and the crimping ring 22 are overlapped with each other is in the range from about 3 mm to about 15 mm, more preferably, in the range from about 3 mm to about 8 mm.

Then, in an embodiment, the grip 26 and the plug frame 25 are engaged with each other, and the boot 27 is disposed such that the boot covers a part of the stop ring 21, the crimping ring 22, and a part of the optical fiber cord 1, thereby completing the optical fiber cable with the optical connector shown in FIG. 1.

Accordingly, the optical fiber cord with the optical connector manufactured by the method for manufacturing of the embodiment according to some embodiments, provide an optical fiber cord with an optical connector of high flexibility resistance.

Although the embodiments have been described with a SC type connector part, the embodiments can be adapted for any of a MU type, a FC type, and LC type parts. Also, the embodiments can be adapted for other optical connectors not listed herein, but having a similar structure.

Although this invention has been disclosed in the context of certain embodiments and examples, it will be understood by those skilled in the art that the present invention extends beyond the specifically disclosed embodiments to other alternative embodiments and/or uses of the invention and obvious modifications thereof. Thus, it is intended that the scope of the present invention herein disclosed should not be limited by the particular disclosed embodiments described above, but should be determined only by a fair reading of the claims that follow.

What is claimed is:

1. An optical fiber cord with an optical connector, wherein said optical fiber cord comprising:
   an optical fiber coated with buffer member;
   a tension member disposed around said optical fiber; and
   an outer jacket accommodating said optical fiber and said tension member therein; and
   wherein said optical connector comprising:
      a stop ring having a through hole formed therein having a crimping part at one end thereof, through which said optical fiber is disposed;
      a crimping ring being disposed around said optical fiber to crimp said stop ring and said optical fiber cord;
      a ferrule being disposed at the tip end part of said optical fiber in said optical fiber cord;
      a spring being disposed around said optical fiber and between said ferrule and said stop ring;
      a plug frame being engaged with said stop ring; and
      a grip being engaged with said plug frame;
   wherein said through hole of said stop ring having a stepwisely narrowing part in which a hole diameter is gradually reduced from said crimping part side to said ferrule side;
   wherein a hole diameter at said crimping part of said through hole is larger than a hole diameter at a ferrule end surface side of said through hole, and
   wherein an outer diameter of said optical fiber cord is at least about 3.5 mm.

2. The optical fiber cord with the optical connector according to claim 1, in which said diameter of said through hole at said crimping part side in said stop ring is larger than the outer diameter of said optical fiber cord.

3. The optical fiber cord with the optical connector according to claim 2, in which said stepwisely narrowing part is located at a position from 10 mm to 30 mm apart from the end surface of said crimping part side.

4. A stop ring for an optical connector having a through hole formed therein and a stepwisely narrowing part in which a hole diameter is gradually reduced from a crimping part side to a ferrule side, wherein a hole diameter at said crimping part of said through hole is larger than a hole diameter at the ferrule end surface side of said through hole.

5. A method for fixing an optical fiber to a ferrule, comprising the steps of:
   passing an optical fiber cord through a crimping ring;
   exposing said optical fiber from the optical fiber cord;

inserting said optical fiber cord in which said optical fiber is exposed into a stop ring having a through hole formed thereto and a stepwisely narrowing part in which a hole diameter is gradually reduced from a crimping part side to a ferrule side formed thereto, from the crimping part side;

passing said optical fiber through a spring; and fixing a ferrule to the tip end of said optical fiber, wherein a hole diameter at said crimping part of said through hole is larger than a hole diameter at the ferrule end surface side of said through hole and an outer diameter of said optical fiber cord is at least about 3.5 mm.

6. A method for manufacturing an optical fiber cord with an optical connector, comprising the steps of:

passing an optical fiber cord through a boot and a crimping ring;

exposing an optical fiber from the optical fiber cord;

inserting said optical fiber cord from a crimping part side, in which said optical fiber is exposed into a stop ring having a through hole formed thereto and a stepwisely narrowing part, in which a hole diameter is gradually reduced from the crimping part side to a ferrule side;

passing the optical fiber through a spring;

fixing a ferrule to the tip end of the optical fiber;

sliding said optical fiber cord from said stop ring to engage a plug frame, said ferrule, and said stop ring with one another; and engaging said plug frame with a grip part, wherein a hole diameter at a crimping part of said through hole is larger than a hole diameter at the ferrule end surface side of said through hole and an outer diameter of said optical fiber cord is at least about 3.5 mm.

* * * * *